(12) United States Patent
Horita

(10) Patent No.: US 8,773,741 B2
(45) Date of Patent: Jul. 8, 2014

(54) COLOR REPRODUCTION PREDICTING APPARATUS, COLOR REPRODUCTION PREDICTING METHOD, AND RECORDING MEDIUM

(75) Inventor: Shuhei Horita, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 182 days.

(21) Appl. No.: 13/240,448

(22) Filed: Sep. 22, 2011

(65) Prior Publication Data
US 2012/0081723 A1 Apr. 5, 2012

(30) Foreign Application Priority Data
Sep. 30, 2010 (JP) ................................. 2010-222952

(51) Int. Cl.
*G03F 3/08* (2006.01)

(52) U.S. Cl.
USPC ............ 358/518; 358/1.9; 358/525; 382/162; 382/167

(58) Field of Classification Search
USPC ............ 358/1.9, 518, 519, 525; 382/162, 167
See application file for complete search history.

(56) References Cited

U.S. PATENT DOCUMENTS

| 7,952,757 B2 * | 5/2011 | Kaneko et al. ................. 358/1.9 |
| 2009/0067017 A1 * | 3/2009 | Monga et al. ................. 358/520 |
| 2009/0168084 A1 * | 7/2009 | Seto ................................ 358/1.9 |

FOREIGN PATENT DOCUMENTS

| JP | 2003-289446 A | 10/2003 |
| JP | 2005-94160 A | 4/2005 |
| JP | 2005-333575 A | 12/2005 |
| JP | 2007-81494 A | 3/2007 |
| JP | 2007-336198 A | 12/2007 |
| JP | 2008-259168 A | 10/2008 |
| JP | 2008-259169 A | 10/2008 |
| JP | 2008-312119 A | 12/2008 |
| JP | 2009-111667 A | 5/2009 |

OTHER PUBLICATIONS

Japanese Office Action for corresponding Japanese patent application No. 2010-222952 dated Dec. 17, 2013 with English translation.

* cited by examiner

*Primary Examiner* — Jamares Q Washington
(74) *Attorney, Agent, or Firm* — Birch, Stewart, Kolasch & Birch, LLP

(57) ABSTRACT

A cell interior point group of a first lattice is determined by determining at least one interior point for each of cells defined based on the first lattice points. Colorimetric values for device values of second lattice points are predicted based on device values and colorimetric values corresponding to the first lattice points, as well as device values and colorimetric values corresponding to the cell interior point group.

13 Claims, 15 Drawing Sheets

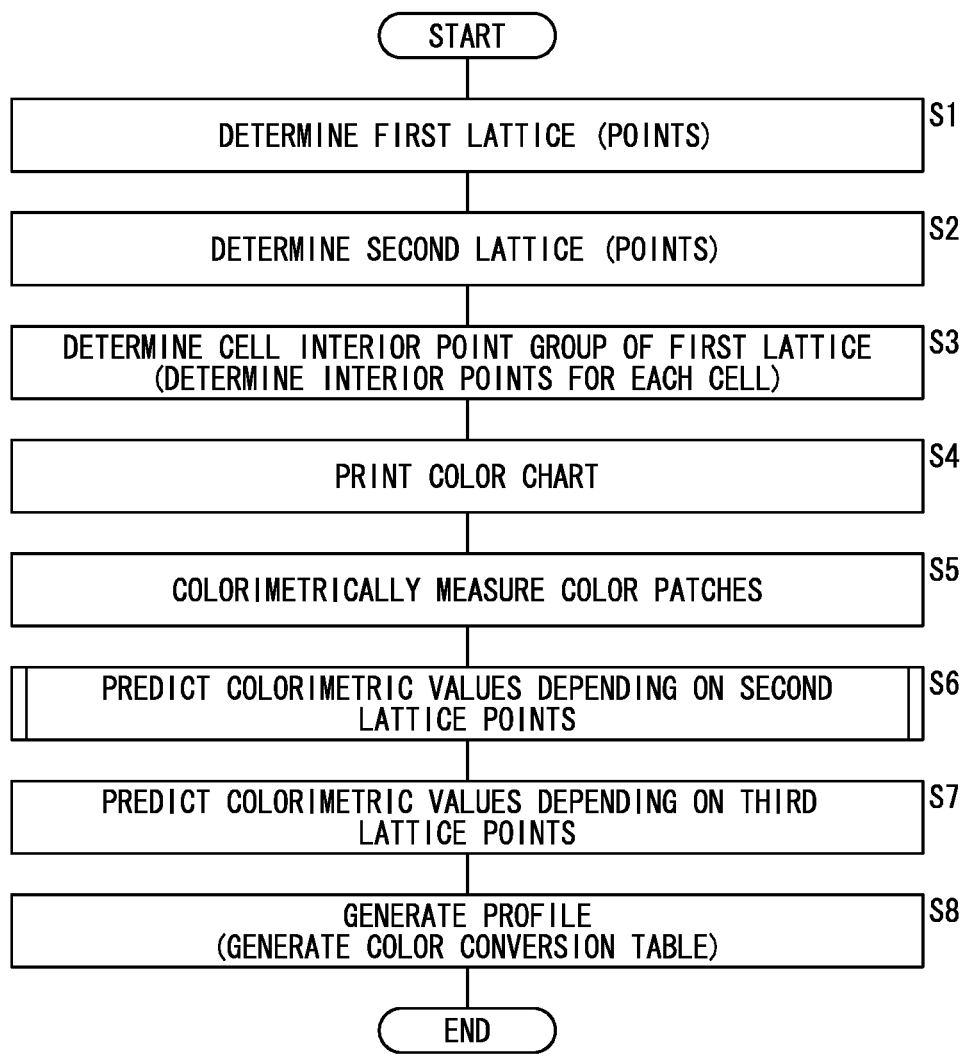

FIG. 9

| PATCH NUMBERS | DEVICE VALUES | | | |
|---|---|---|---|---|
| | C (%) | M (%) | Y (%) | K (%) |
| 1~125 | COMBINATIONS OF (0, 20, 40, 70, 100) [125] | | | 0 |
| 126~152 | COMBINATIONS OF (0, 20, 40, 100) [27] | | | 40 |
| 153~160 | COMBINATIONS OF (0, 100) [8] | | | 100 |
| 161~176 | COMBINATIONS OF (20, 70) [16] | | | |
| 177~182 | 10, 30, 50, 60, 80, 90 | 0 | 0 | 0 |
| 183~188 | 0 | 10, 30, 50, 60, 80, 90 | 0 | 0 |
| 189~194 | 0 | 0 | 10, 30, 50, 60, 80, 90 | 0 |
| 195~202 | 0 | 0 | 0 | 10, 20, 30, 50, 60, 70, 80, 90 |

FIG. 15

| | PREDICTION PROCESSES | NUMBER OF COLOR PATCHES | AVERAGE COLOR DIFFERENCE | MAXIMUM COLOR DIFFERENCE | COLOR DIFFERENCE AT K = 0% | COLOR DIFFERENCE AT K = 20% | COLOR DIFFERENCE AT K = 40% | COLOR DIFFERENCE AT K = 70% |
|---|---|---|---|---|---|---|---|---|
| COMPARATIVE EXAMPLE 1 | VOLUMETRIC INTERPOLATION | 928 | 1.3 | 6.2 | 1.8 | 1.3 | 0.9 | 0.7 |
| COMPARATIVE EXAMPLE 2 | CELLULAR SPECTRAL NEUGEBAUER MODEL | 186 | 2.0 | 7.6 | 1.2 | 2.5 | 1.6 | 2.9 |
| COMPARATIVE EXAMPLE 3 | CELLULAR YULE-NIELSEN SPECTRAL NEUGEBAUER MODEL (ADJUSTMENT PARAMETERS ARE OF A CONSTANT VALUE) | 186 | 3.9 | 12.2 | 1.2 | 5.7 | 3.1 | 6.8 |
| INVENTIVE EXAMPLE | · INTRODUCTION OF CELL INTERIOR POINTS · ADJUSTMENT PARAMETERS DEPEND ON CELLS | 202 (=186+16) | 1.5 | 7.7 | 1.2 | 1.9 | 1.3 | 1.2 |

COLOR REPRODUCTION PREDICTING APPARATUS, COLOR REPRODUCTION PREDICTING METHOD, AND RECORDING MEDIUM

CROSS-REFERENCE TO RELATED APPLICATION

This application is based upon and claims the benefit of priority from Japanese Patent Application No. 2010-222952 filed on Sep. 30, 2010, of which the contents are incorporated herein by reference.

BACKGROUND OF THE INVENTION

1. Field of the Invention

The present invention relates to a color reproduction predicting apparatus, a color reproduction predicting method, and a program for predicting color reproduction.

2. Description of the Related Art

With significant advances in inkjet technology in recent years, it has become possible for inkjet printers to produce large color prints of high quality at high speeds. Inkjet printers are not only popular for private or home use, but also are widely used in commercial applications nowadays. Inkjet printers make it possible to print on POP (Point Of Purchase) posters, wall posters, large-size mediums such as outdoor advertisements and billboards, roll mediums, and thick hard mediums.

Since advertisement prints are expected to be effective to arouse consumers' motivation to buy advertised products through visual sensation, the finish of the colors of the prints is of particular importance. Heretofore, there have been disclosed various color matching technologies as print color managing means, such as a method of generating an ICC (International Color Consortium) profile, which is capable of achieving both high color reproduction accuracy and a reduced number of man-hours, by reducing the number of color patches to be printed and colorimetrically measured.

Japanese Laid-Open Patent Publication No. 2007-081494 discloses a method of and an apparatus for predicting and supplying, by applying a Neugebauer model, data lacking in lattice-point data, which are required in a case where a cellular Neugebauer model is applied. This publication states that a smooth color representation can be achieved with high accuracy in the vicinity of a gamut boundary.

Japanese Laid-Open Patent Publication No. 2009-111667, Japanese Laid-Open Patent Publication No. 2008-259168, and Japanese Laid-Open Patent Publication No. 2008-259169 disclose methods of and apparatus for acquiring data of lattice points required to apply a cellular Yule-Nielsen spectral Neugebauer model, by applying a sufficiently learned neural network model to data of a first representative point (part of lattice points) that has been obtained by a colorimetric process, so as to predict a second representative point (remaining lattice points). These publications state that the disclosed method and apparatus are capable of accurately predicting print results with less printing and colorimetry.

SUMMARY OF THE INVENTION

It is known generally with respect to mathematical models for predicting a desired color in a cell using lattice point data that the accuracy of color reproduction varies depending on the distance from a closest lattice point. For example, the accuracy of color reproduction tends to be higher for colors closer to the lattice points, whereas accuracy tends to be reduced in the vicinity of the position of a center of gravity of the cell.

However, the methods and apparatus disclosed in Japanese Laid-Open Patent Publication No. 2007-081494, Japanese Laid-Open Patent Publication No. 2009-111667, Japanese Laid-Open Patent Publication No. 2008-259168, and Japanese Laid-Open Patent Publication No. 2008-259169 are problematic in that if the number of color patches is reduced, the accuracy of color reproduction in the vicinity of the position of the center of gravity of the cell drops sharply. For achieving a practical level of color reproduction accuracy, it is necessary to print and colorimetrically measure at least a predetermined number of color patches. Therefore, it has been difficult to further improve efficiency of the profile generating process.

An object of the present invention is to provide a color reproduction predicting apparatus, a color reproduction predicting method, and a program for achieving a high level of color reproduction accuracy, even in cases where a reduced number of color patches are printed and colorimetrically measured.

A color reproduction predicting apparatus according to the present invention comprises a lattice point determiner for determining first lattice points for forming a first lattice in a device value space, and second lattice points for forming a second lattice in the device value space, the first lattice, an interior point group determiner for determining a cell interior point group of the first lattice by determining at least one interior point for each of cells defined based on the first lattice points determined by the lattice point determiner, and a colorimetric value predictor for predicting colorimetric values for device values of the second lattice points determined by the lattice point determiner, based on device values and colorimetric values corresponding to the first lattice points determined by the lattice point determiner, as well as device values and colorimetric values corresponding to the cell interior point group determined by the interior point group determiner.

The colorimetric value predictor preferably predicts the colorimetric values using a predicting process depending on the cells.

The predicting process depending on the cells preferably comprises a process for using adjustment parameters depending on the cells, respectively, with respect to a predetermined prediction model that includes at least one of the adjustment parameters.

The color reproduction predicting apparatus preferably further comprises an adjustment parameter determiner for determining the adjustment parameters for the cells, respectively, such that the colorimetric value predictor predicts the colorimetric values using the adjustment parameters determined by the adjustment parameter determiner.

The adjustment parameter determiner preferably determines the adjustment parameters in order to minimize differences between colorimetric values acquired by a colorimetric measuring process and colorimetric values predicted using the predetermined prediction model, at interior points of the cells.

Preferably, the colorimetric values are represented by spectral reflectances or spectral transmittances, and the adjustment parameters are parameters for each light wavelength.

The predetermined prediction model preferably comprises a cellular Yule-Nielsen spectral Neugebauer model.

The lattice point determiner preferably further determines third lattice points for forming a third lattice in the device value space, the third lattice having smaller lattice intervals than the second lattice, and the colorimetric value predictor preferably further predicts colorimetric values for device values of the third lattice points determined by the lattice point determiner, based on the predicted colorimetric values corresponding to the second lattice points.

The color reproduction predicting apparatus preferably further comprises a data acquirer for acquiring colorimetric values obtained by colorimetrically measuring a plurality of color patches depending on the first lattice points and the cell interior point group.

The data acquirer preferably acquires colorimetric values that become fewer as the range of a gamut is made smaller.

The color reproduction predicting apparatus preferably further comprises a profile generator for generating a profile based on the device values and the colorimetric values corresponding to the second lattice points, or the device values and the colorimetric values corresponding to the third lattice points.

The color reproduction predicting apparatus preferably further comprises a color converter for converting colors of a print using the profile generated by the profile generator as an output profile.

A color reproduction predicting method according to the present invention comprises a lattice point determining step of determining first lattice points for forming a first lattice in a device value space, and second lattice points for forming a second lattice in the device value space, the second lattice having smaller lattice intervals than the first lattice, an interior point group determining step of determining a cell interior point group of the first lattice by determining at least one interior point for each of cells defined based on the determined first lattice points, and a colorimetric value predicting step of predicting colorimetric values for device values of the determined second lattice points, based on device values and colorimetric values corresponding to the determined first lattice points, as well as device values and colorimetric values corresponding to the determined cell interior point group.

According to the present invention, there is also provided a recording medium for storing a program for predicting color reproduction, the program enabling a computer to function as a lattice point determiner for determining first lattice points for forming a first lattice in a device value space, and second lattice points for forming a second lattice in the device value space, the second lattice having smaller lattice intervals than the first lattice, an interior point group determiner for determining a cell interior point group of the first lattice by determining at least one interior point for each of cells defined based on the first lattice points determined by the lattice point determiner, and a colorimetric value predictor for predicting colorimetric values for device values of the second lattice points determined by the lattice point determiner, based on device values and colorimetric values corresponding to the first lattice points determined by the lattice point determiner, as well as device values and colorimetric values corresponding to the cell interior point group determined by the interior point group determiner.

With the color reproduction predicting apparatus, the color reproduction predicting method, and the recording medium according to the present invention, at least one interior point at a time, i.e., a cell interior point group, is determined for each of cells defined based on the first lattice points, and is used to predict colorimetric values for device values of second latticed points. The first lattice points and the cell interior point group are used together to allow colorimetrically measured points (plotted points of measured data) in a device value space to be arranged uniformly and efficiently. Consequently, the minimum distance between any desired point and a colorimetrically measured point in a cell is made smaller compared to a case of using simple lattice points. The smaller minimum distance manifests itself in the vicinity of positions of centers of gravity of the cells. As a consequence, high color reproduction accuracy can be accomplished without the need for reduced lattice intervals of the first lattice, i.e., even in a case where a small number of color patches are printed and colorimetrically measured.

The above and other objects, features, and advantages of the present invention will become more apparent from the following description in a case where taken in conjunction with the accompanying drawings in which preferred embodiments of the present invention are shown by way of illustrative example.

BRIEF DESCRIPTION OF THE DRAWINGS

FIG. 5 is a flowchart of an operation sequence of the color reproduction predicting apparatus shown in FIG. 1;

FIG. 9 is a diagram showing by way of example device values corresponding to color patches shown in FIG. 2;

FIG. 15 is a diagram showing results of a comparison between color reproduction accuracies of an Inventive Example and Comparative Examples 1 through 3.

DESCRIPTION OF THE PREFERRED EMBODIMENTS

A color reproduction predicting method according to a preferred embodiment of the present invention, in relation to a color reproduction predicting apparatus and a printing system that carry out the color reproduction predicting method, will be described in detail below with reference to the drawings.

Figure 1:
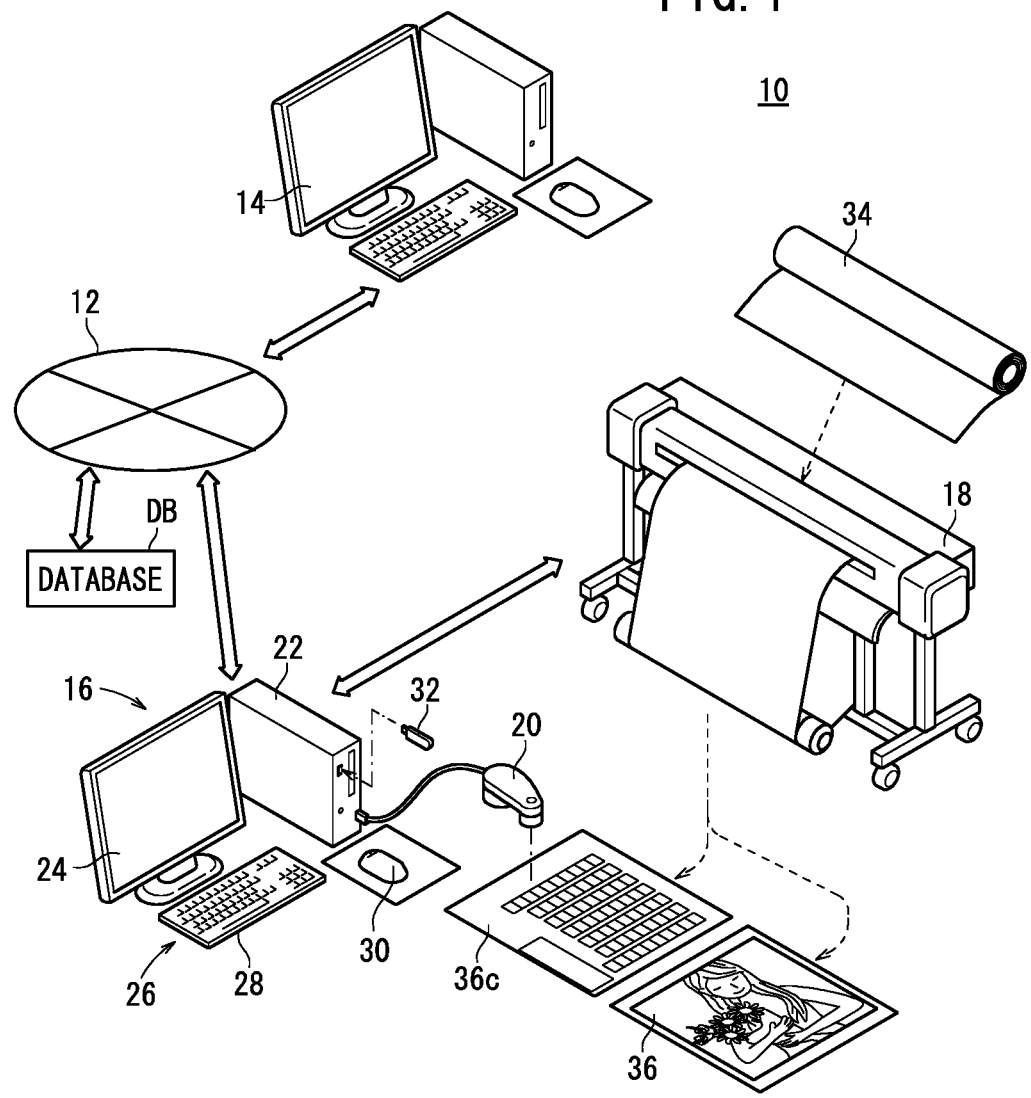
FIG. 1 is a perspective view of a printing system incorporating a color reproduction predicting apparatus according to an embodiment of the present invention.

FIG. 1 is a perspective view of a printing system 10 incorporating a color reproduction predicting apparatus 16 according to an embodiment of the present invention.

As shown in FIG. 1, the printing system 10 basically comprises a network 12, an editing apparatus 14, a color reproduction predicting apparatus 16, a printing machine 18, and a colorimeter 20.

The network 12 is constructed according to communication standards such as Ethernet (registered trademark) or the like. The editing apparatus 14 and the color reproduction predicting apparatus 16 are connected to each other and also to a database DB by wired or wireless links through the network 12.

The editing apparatus 14 is capable of editing the arrangement of color images made up of characters, figures, pictures, photos, etc., on each of pages to be printed. The editing apparatus 14 generates electronic manuscripts (print data) in a page description language (hereinafter referred to as "PDL"), e.g., 8-bit image data in color channels of four colors (C, M, Y, K) or three colors (R, G, B).

PDL refers to a language, which is descriptive of image information including format information, positional information, color information (including density information), etc., of characters, figures, etc., in a "page" that serves as an output unit for printing, displaying, or the like. Known types of PDL include PDF (Portable Document Format according to 15032000-1:2008), PostScript (registered trademark) of AdobeSystems, and XPS (XML Paper Specification).

The color reproduction predicting apparatus 16 performs functions to convert an electronic manuscript described by PDL into an electronic manuscript represented by raster data in a raster format, e.g., bitmap image data or TIFF data, perform a desired image processing process, e.g., a color conversion process, an image scaling process, an image arranging process, etc., on the raster data, convert the processed raster data into print control signals that match the printing machine 18, and send the print control signals to the printing machine 18.

The color reproduction predicting apparatus 16 comprises a main unit 22 including a CPU, a memory, etc., a display device 24 for displaying color images, and an input device 26 serving as an input unit including a keyboard 28 and a mouse 30 for entering various data and operation commands. The mouse 30, which serves as a pointing device, may be replaced with a track pad or a track ball.

A portable memory 32 for recording electronic data therein and deleting electronic data therefrom, and the colorimeter 20 are connected to the main unit 22 of the color reproduction predicting apparatus 16.

The printing machine 18 comprises an inkjet printing apparatus for producing a color image based on a combination of standard inks of colors C, M, Y, K (process colors) and optional inks of light colors such as LC, LM, etc., and W (white). The printing machine 18 controls the propulsion of inks onto a print medium 34 (a rolled non-printed medium in FIG. 1) based on print control signals received from an external apparatus, e.g., the color reproduction predicting apparatus 16, to print a color image on the print medium 34, thereby producing a print 36, which may include a color chart 36c.

The print medium 34 may comprise a paper medium such as synthetic paper, thick paper, aluminum-evaporated paper, or the like, a resin medium such as of vinyl chloride, PET, or the like, or tarpaulin paper, or the like.

The colorimeter 20 measures the color values of an object to be measured, depending on a prescribed colorimetric process command. Such color values refer not only to device-independent data, such as tristimulus values X, Y, Z, the coordinates L*, a*, b* of a uniform color space, etc., but also to a distribution of optical physical quantities with respect to wavelengths (hereinafter referred to as "spectral data"). The spectral data may represent a spectral radiance distribution, a spectral sensitivity distribution, a spectral reflectance, or a spectral transmittance, for example.

The database DB comprises a database server for managing data such as job tickets of electronic manuscripts, e.g., JDF (Job Definition Format) files, color sample data, target profiles, or profiles suitable for print mediums 34.

Figure 2:
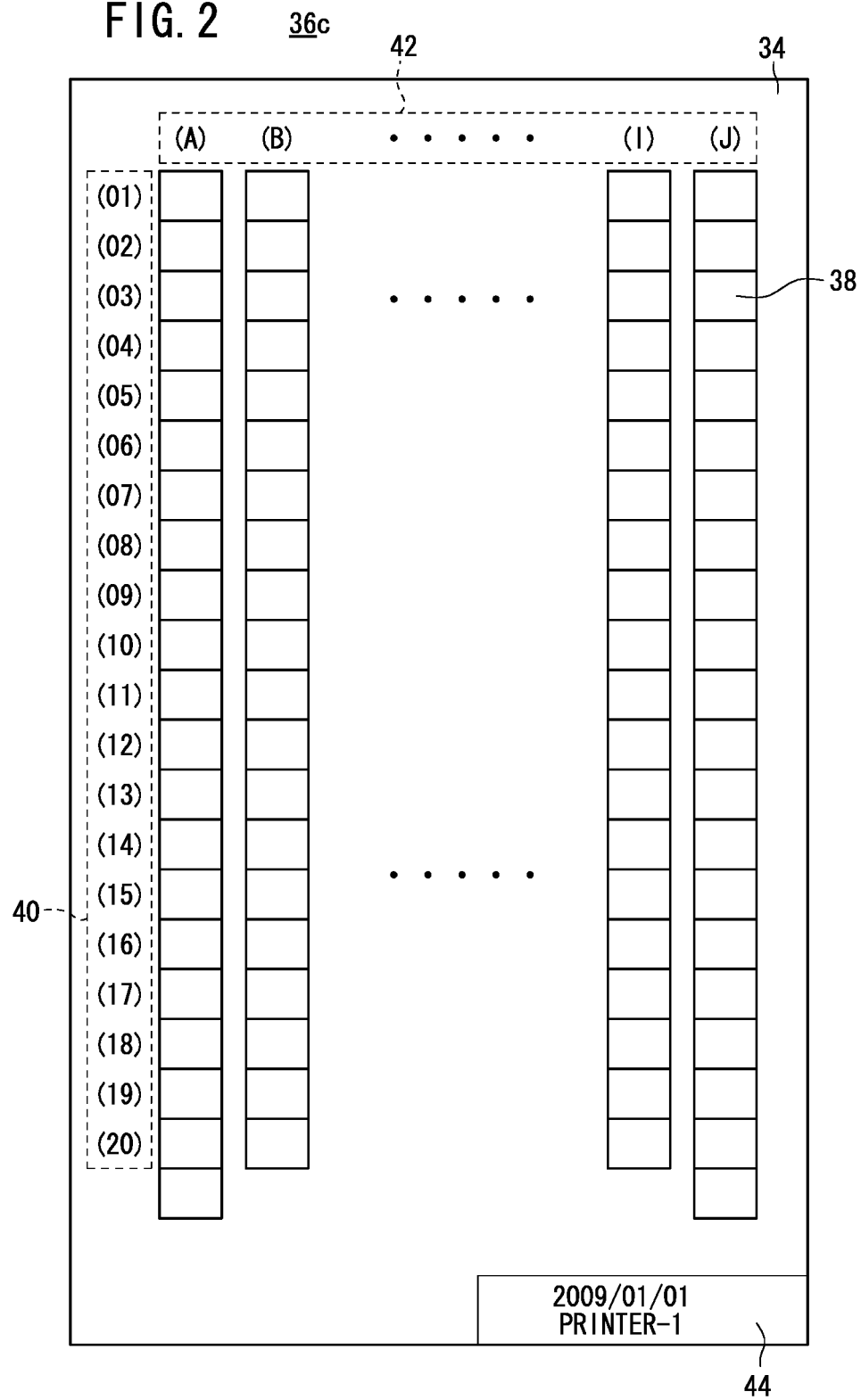
FIG. 2 is a schematic front elevational view of a color chart shown in FIG. 1.

FIG. 2 is a schematic front elevational view of the color chart 36c shown in FIG. 1.

The color chart 36c shown in FIG. 2 comprises 202 color patches 38 of different colors, which are substantially identical in shape and arranged in rows and columns, a sequence of numbers 40, and a sequence of alphabetical letters 42 for identifying the positions of the color patches 38 along directions of the rows and columns, and print information 44 for identifying conditions for printing the color chart 36c, all of which are printed on a print medium 34.

The color patches 38 are arranged in a matrix having 20 vertical columns and 10 horizontal rows, the color patches 38 being spaced from each other by given intervals. Colors of the respective color patches 38 are set to given values in a range of signal levels of C, M, Y, K values (a percentage range from 0% to 100% or an 8-bit gradation range from 0 to 255).

The sequence of numbers 40 represents a vertical string of characters ranging from (01) to (20), positioned in alignment with and to the left of the respective rows of color patches 38. The sequence of alphabetical letters 42 represents a horizontal string of characters ranging from (A) to (J), positioned in alignment with and at the top of the respective columns of color patches 38.

The print information 44, which is printed on the print medium 34, represents a type and serial number or a registered name of the printing machine 18, a print mode, to be described later, the type of print medium 34, a print date, etc.

Figure 3:
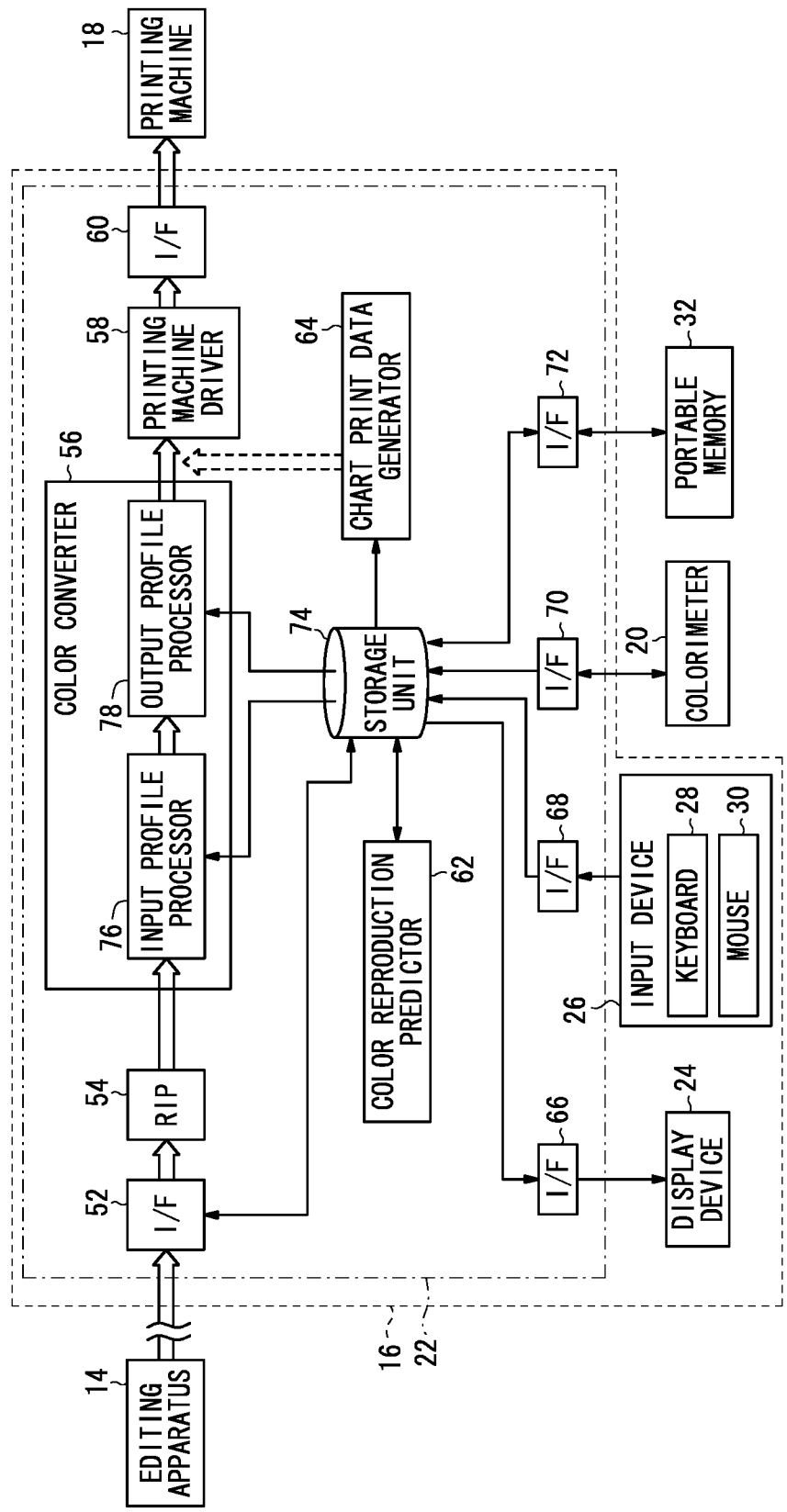
FIG. 3 is a functional block diagram of the color reproduction predicting apparatus shown in FIG. 1.

FIG. 3 is a functional block diagram of the color reproduction predicting apparatus 16 shown in FIG. 1. In FIG. 3, an electronic manuscript is supplied along directions indicated by the outlined solid-line arrows, print data for the color chart 36c are supplied along a direction indicated by the outlined broken-line arrow, and various other data are supplied along directions indicated by the solid-line arrows.

As shown in FIG. 3, the main unit 22 of the color reproduction predicting apparatus 16 includes an I/F 52 for entering an electronic manuscript supplied from the editing apparatus 14, a RIP (Raster Imaging Processor) 54 for converting the PDL format of the electronic manuscript supplied from the I/F 52 into a raster format, a color converter 56 for performing a color conversion process on the converted C, M, Y, K values (or R, G, B values) of the electronic manuscript supplied from the RIP 54 to produce print data of new C, M, Y, K values, a printing machine driver (print controller) 58 for converting the print data of the new C, M, Y, K values produced by the color converter 56 into print control signals (ink propulsion control data) that match the printing machine 18, and an I/F 60 for outputting print control signals generated by the printing machine driver 58 to the printing machine 18.

The main unit 22 also includes a color reproduction predictor 62 for predicting colors reproduced by a printing process and for generating a profile for the printing machine 18, a chart print data generator 64 for generating print data required to print the color chart 36c, an I/F 66 for connection to the display device 24, an I/F 68 for connection to the input device 26 including the keyboard 28 and the mouse 30, an I/F 70 for connection to the colorimeter 20, and an I/F 72 for connection to the portable memory 32.

The main unit 22 also includes a storage unit 74 for storing various data supplied from various components of the main unit 22, and for supplying the stored data to various components of the main unit 22. The storage unit 74 is connected to the RIP 54, the color converter 56, the color reproduction predictor 62, the chart print data generator 64, the I/F 66, the I/F 68, the I/F 70, and the I/F 72.

The color converter 56 comprises an input profile processor 76 for converting device-dependent data into device-independent data, and an output profile processor 78 for converting device-independent data into device-dependent data. Device-dependent data refer to data defined in terms of C, M, Y, K values, R, G, B values, or the like, which may be referred to as "device values" for appropriately driving various devices. Device-independent data refer to data defined in terms of a display system, such as an HSV (Hue-Saturation-Value) system, an HLS (Hue-Lightness-Saturation) system, a CIELAB system, a CIELUV system, an XYZ system, or the like.

The RIP 54 can perform various image processing operations including an image scaling process depending on the resolution, etc., of the printing machine 18, and a rotating and inverting process depending on a printing format at the time an electronic manuscript is converted into raster data.

The printing machine driver 58 generates ink propulsion control data corresponding to ink colors (C, M, Y, K, LC, LM, or W) from C, M, Y, K values. Ink propulsion control data are data for appropriately controlling an ink ejecting operation of the printing machine 18 (ink ejection ON/OFF, ink dot diameters, etc.). The printing machine driver 58 may generate ink propulsion control data according to a known algorithm such as a dither matrix method, an error diffusion method, or the like, although the ink propulsion control data must be converted from an 8-bit multiple-gradation image into a low-gradation image such as a binary image.

The input profile processor 76 or the output profile processor 78 is capable of correcting a profile depending on a print mode of the printing machine 18. The term "print mode" refers to various print settings, such as the number of nozzles of the print head, the timing (unidirectional/bidirectional) of ink ejection during scanning of the print head, the number of passes, the number and type of inks used in the printing machine 18, an algorithm for generating ink propulsion control data, etc.

The main unit 22 has a controller (not shown) comprising a CPU, etc., for controlling all of the image processing functions described above. More specifically, the controller controls not only operations of various components of the main unit 22, e.g., reading data from and writing data to the storage unit 74, but also transmission of display signals via the I/F 66 to the display device 24, and acquisition of colorimetric data from the colorimeter 20 via the I/F 70.

Figure 4:
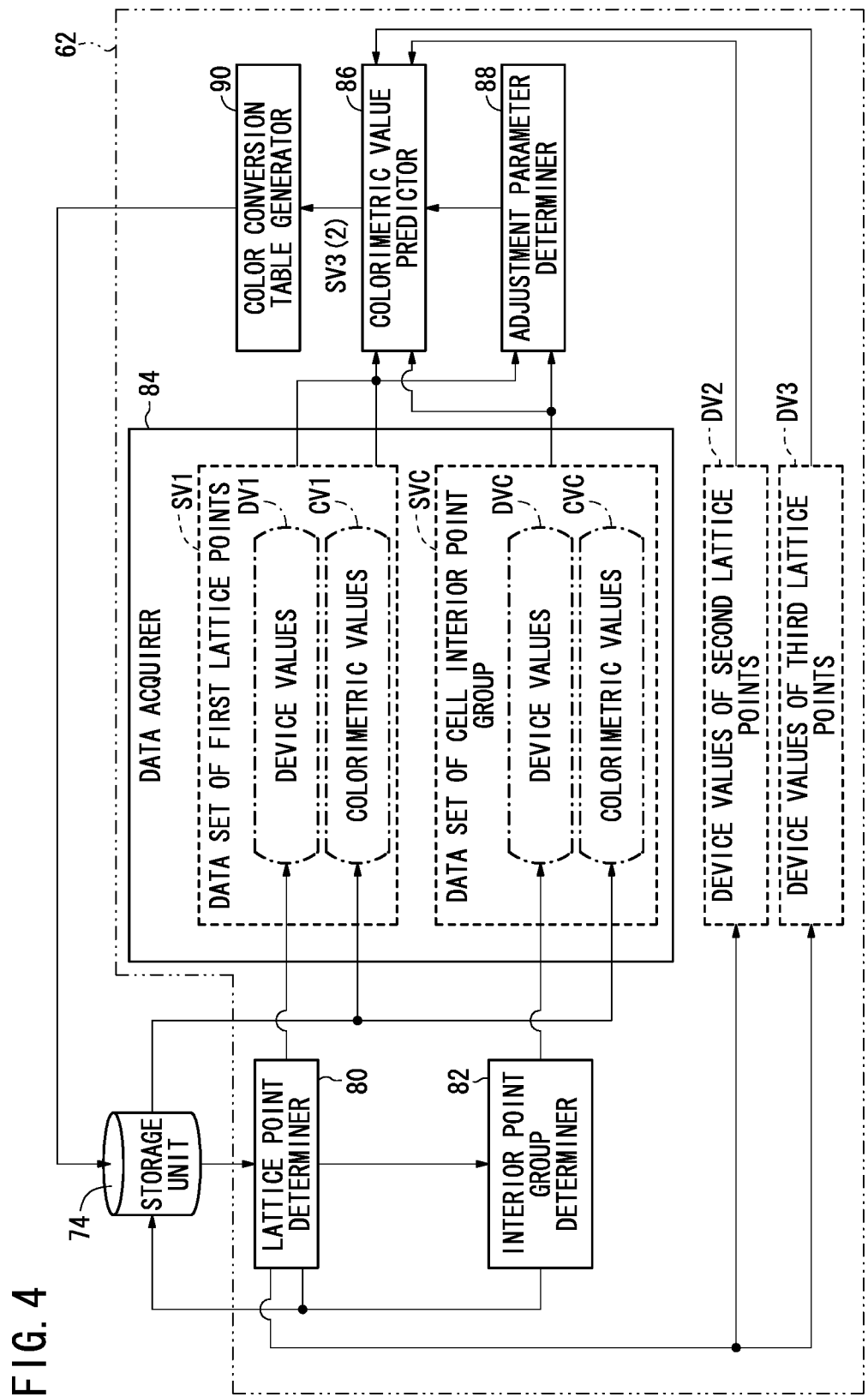
FIG. 4 is a functional block diagram of a color reproduction predictor shown in FIG. 3.

FIG. 4 is a functional block diagram of the color reproduction predictor 62 shown in FIG. 3.

As shown in FIG. 3, the color reproduction predictor 62 includes a lattice point determiner 80, an interior point group determiner 82, a data acquirer 84, a colorimetric value predictor 86, an adjustment parameter determiner 88, and a color conversion table generator (profile generator) 90.

The lattice point determiner 80 determines first lattice points LP1 that form a first lattice LT1 in a CMYK space (device value space). The lattice point determiner 80 also determines second lattice points LP2 that form a second lattice LT2 in the CMYK space. The second lattice LT2 has a lattice interval smaller than that of the first lattice LT1. The lattice point determiner 80 further determines third lattice points LP3 that form a third lattice LT3 in the CMYK space. The third lattice points LP3 correspond to input values in a color conversion table to be generated.

The interior point group determiner 82 determines at least one interior point for each of cells, which are defined based on the first lattice points LP1. The interior point refers to any desired point that exists in a cell, and does not cover points on the boundary of a cell. A set of interior points in each cell will be referred to as a "cell interior point group CP".

The data acquirer 84 acquires device values DV1 and colorimetric values CV1 of the first lattice points LP1, and device values DVC and colorimetric values CVC of the cell interior point group CP. A data set of device values and colorimetric values will also be referred to as a "data set".

The colorimetric value predictor 86 predicts colorimetric values CV2 for device values DV2 of the second lattice points LP2, using a data set SV1 of the first lattice points LP1 and a data set SVC of the cell interior point group CP. The colorimetric value predictor 86 predicts colorimetric values CV2 according to a prediction process depending on each of cells defined by the first lattice points LP1. The colorimetric value predictor 86 predicts colorimetric values using an adjustment parameter, which depends on each cell, with respect to a prediction model (e.g., a cellular Yule-Nielsen spectral Neugebauer model) including at least one adjustment parameter.

The colorimetric value predictor 86 also predicts colorimetric values CV3 for device values DV3 of the third lattice points LP3, based on a data set SV2 of the second lattice points LP2.

The adjustment parameter determiner 88 determines a value of the adjustment parameter to be used in a predicting process carried out by the colorimetric value predictor 86. The adjustment parameter determiner 88 also optimizes the value of the adjustment parameter for each of cells defined by the first lattice points LP1. More specifically, the adjustment parameter determiner 88 determines a value of the adjustment parameter in order to minimize the difference between a colorimetric value CVC acquired by a colorimetric process and a colorimetric value predicted using a given prediction model, at an interior point of a cell.

The color conversion table generator 90 generates a color conversion table, which makes up part of the data of a profile. More specifically, the color conversion table generator 90 generates a color conversion table by arranging a data set SV3 of the third lattice points LP3 according to a given format. The color conversion table includes an A2B table for converting C, M, Y, K values into L*, a*, b* values, and a B2A table for converting L*, a*, b* values into C, M, Y, K values. The color conversion table generator 90 also generates a profile by combining the generated color conversion table with given file data.

The color reproduction predicting apparatus 16 according to the present embodiment is constructed as described above. The image processing functions described above can be performed in accordance with application programs stored in the storage unit 74, which operate under the control of a basic program (operating system).

The aforementioned programs may be recorded in a computer-readable recording medium (e.g., the portable memory 32 shown in FIG. 1), and may be read into a computer system and executed thereby. The term "computer system" includes an OS and hardware including peripheral devices. The computer-readable recording medium comprises a portable medium including a storage device such as a flexible disk, a magnetooptical disk, a CD-ROM, or the like, or a storage unit such as a hard disk or the like incorporated in the computer system. The computer-readable recording medium also includes a medium for dynamically holding programs for a short period of time, such as a communication line for transmitting programs via a network such as the Internet or the like or a communication channel such as a telephone line, or a memory for holding programs for a certain period of time such as a volatile memory in a computer system, which functions as a server or a client in a network environment.

The printing system 10 according to the present embodiment is basically constructed as described above. Operations of the color reproduction predicting apparatus 16 for generating a profile will be described below with reference to the flowchart shown in FIG. 5 and the functional block diagram shown in FIG. 4.

The lattice point determiner 80 determines first lattice points LP1 in order to form a first lattice LT1 in the CMYK space (step S1).

Figure 6A:
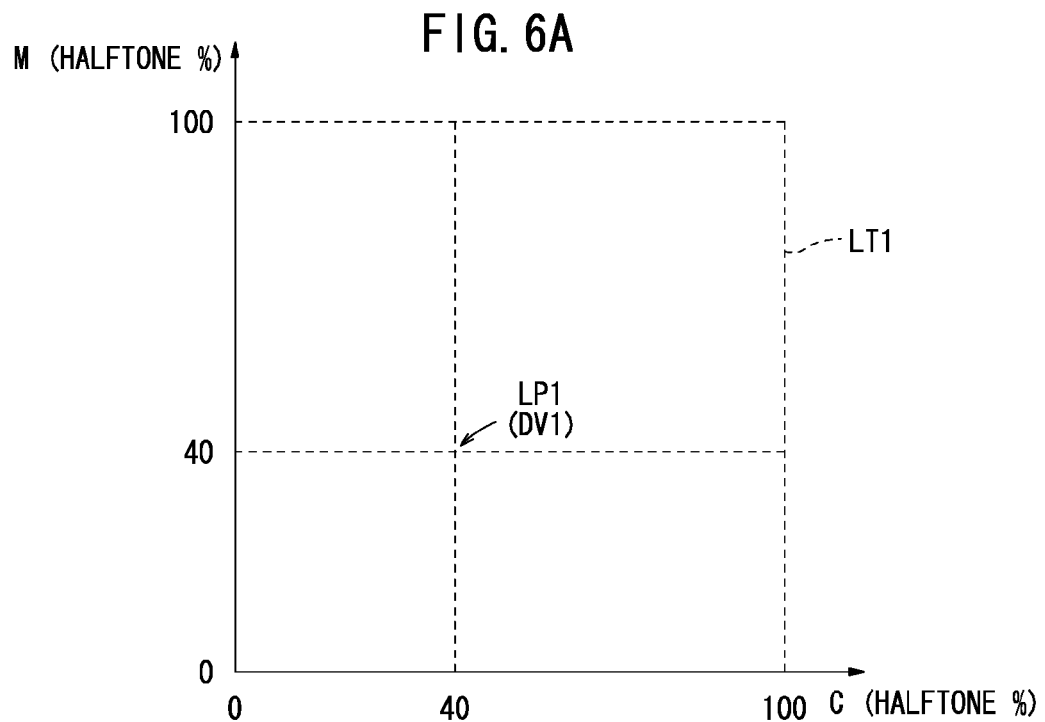
FIG. 6A is a graph showing a determined example of a first lattice.

FIG. 6A is a graph showing a determined example of the first lattice LT1. The graph has a horizontal axis representative of the halftone percentage (0% through 100%) of a color C, and a vertical axis representative of a halftone percentage (0% through 100%) of a color M. For the sake of brevity, the halftone percentage (%) of a color C, the halftone percentage (%) of a color M, the halftone percentage (%) of a color Y, and the halftone percentage (%) of a color K will hereinafter be referred to as a "C value", an "M value", a "Y value, and a "K value", respectively.

The first lattice LT1 actually is defined in a four-dimensional device value space (CMYK space) of C, M, Y, K values. However, for illustrative purposes, the first lattice LT1 will be represented in a two-dimensional device value space of C and M values. The remaining device values (Y and K values) are omitted from illustration. This holds true also for a second lattice LT2 and a third lattice LT3, to be described later.

The first lattice LT1 has lattice lines crossing each other at points, i.e., first lattice points LT1, where each device value is either 0% (lowest value), 40% (intermediate value), or 100% (highest value). In FIG. 6A, reference characters DV1 denote device values corresponding to the first lattice points LT1. Although there are a total of nine first lattice points LT1, only one first lattice point (C, M)=(40, 40) is denoted by LT1 in FIG. 6A.

For higher color reproduction accuracy, the first lattice points LT1 should preferably include device values having a lowest value (0%) and a highest value (100%). The numerical value of the intermediate value (40% in FIG. 6A) may be changed as required.

Figure 7:
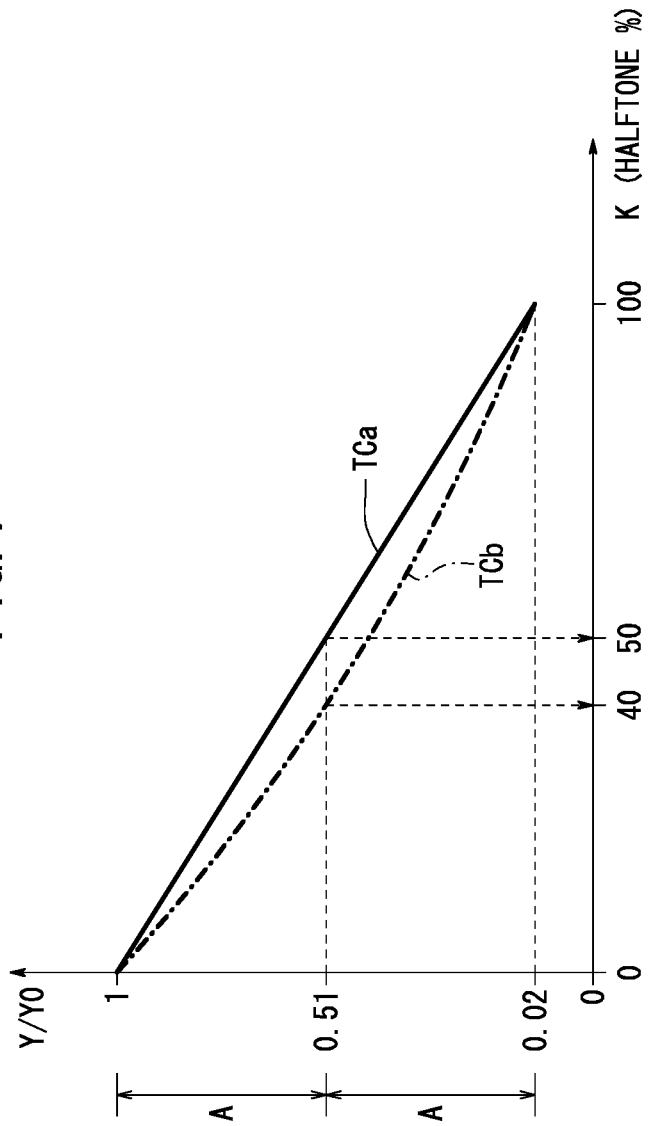
FIG. 7 is a graph that illustrates a process for determining an intermediate value of a first lattice point.

FIG. 7 is a graph illustrative of a process for determining an intermediate value of the first lattice point LP1. The graph has a horizontal axis representative of K values and a vertical axis of (Y/Yo) where Y indicates one of tristimulus values X, Y, Z, and Yo corresponds to Y at a white reference point.

In FIG. 7, a first gradation curve TCa, as indicated by the solid line, is a straight line passing through two points (0, 1) and (100, 0.02). An intermediate K value is determined such that the difference between (Y/Yo) at K=0% and (Y/Yo) at an intermediate value is substantially equal to the difference between (Y/Yo) at the intermediate value and (Y/Yo) at K=100%. In the example shown in FIG. 7, since A=(1-0.02)/2=0.49, K=50% corresponding to (Y/Yo)=0.02+0.49=0.51 is used as an intermediate value based on the first gradation curve TCa.

A second gradation curve TCb, as indicated by the dot-and-dash line, is a downwardly convex smooth curve passing through the two points (0, 1) and (100, 0.02). According to the above process, K=40% corresponding to (Y/Yo)=0.51 is used as an intermediate value based on the second gradation curve TCb.

The type of data represented by the horizontal axis of the graph shown in FIG. 7 is not limited to K values, but may be C values, M values, or Y values, or any combination thereof. For example, the horizontal axis may be representative of a combination of C values and M values, a combination of C values, M values, and Y values exclusive of K values, or a combination of all C values, M values, Y values, and K values.

Tristimulus values X, Y, Z whose range is maximized, i.e., the difference between maximum and minimum values of which is maximized, are selected for each of the device values in order to reduce variations caused by printing and colorimetry. With respect to C, M, Y, K values, a combination of data representing C values and (X/Xo), M values and (Y/Yo), Y values and (Z/Zo), and K values and (Y/Yo) should preferably be adopted.

The type of data represented by the vertical axis of the graph shown in FIG. 7 is not limited to tristimulus values X, Y, Z, but may be any device-independent data including L*, a*, b* values. Intermediate values are not limited to one level, but may be of two or more levels. If the intermediate value is of three levels, for example, each intermediate value may be determined such that each interval of (Y/Yo) is defined by A/2.

Then, the lattice point determiner 80 determines second lattice points LP2 in order to form a second lattice LT2 in the CMYK space (step S2).

Figure 6B:
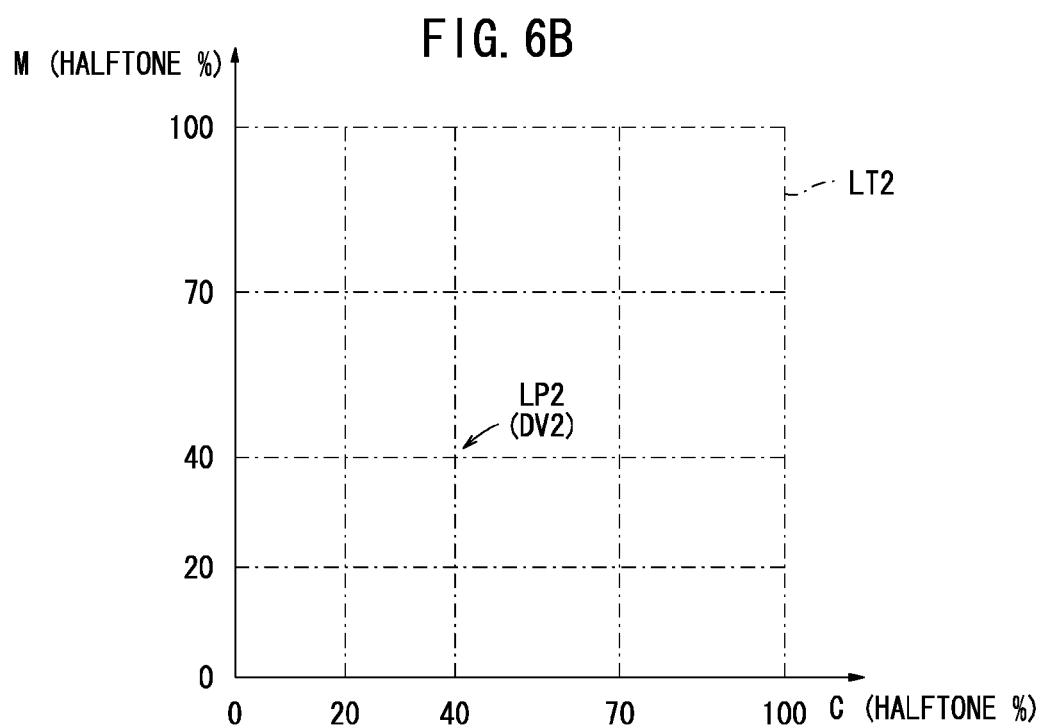
FIG. 6B is a graph showing a determined example of a second lattice.

FIG. 6B is a graph showing a determined example of the second lattice LT2. The graph shown in FIG. 6B is defined in the same manner as the graph shown in FIG. 6A, and will not be described in detail.

The second lattice LT1 has lattice lines crossing each other at points, i.e., second lattice points LT2, where each device value is either 0%, 20%, 40%, 70%, or 100%. In FIG. 6B, reference characters DV2 denote device values corresponding to the second lattice points LT2. Although there are a total of twenty-five second lattice points LT2, only one second lattice point (C, M)=(40, 40) is denoted by LT2 in FIG. 6B.

According to the present embodiment, as shown in FIGS. 6A and 6B, the second lattice points LP2 are related to the first lattice points LP1, such that the second lattice points LP2 cover all of the first lattice points LP1. Stated otherwise, the lattice interval of the second lattice LT2 is smaller than the lattice interval of the first lattice LT1.

Then, the interior point group determiner 82 determines a cell interior point group CP of the first lattice LT1 (step S3).

Figure 8:
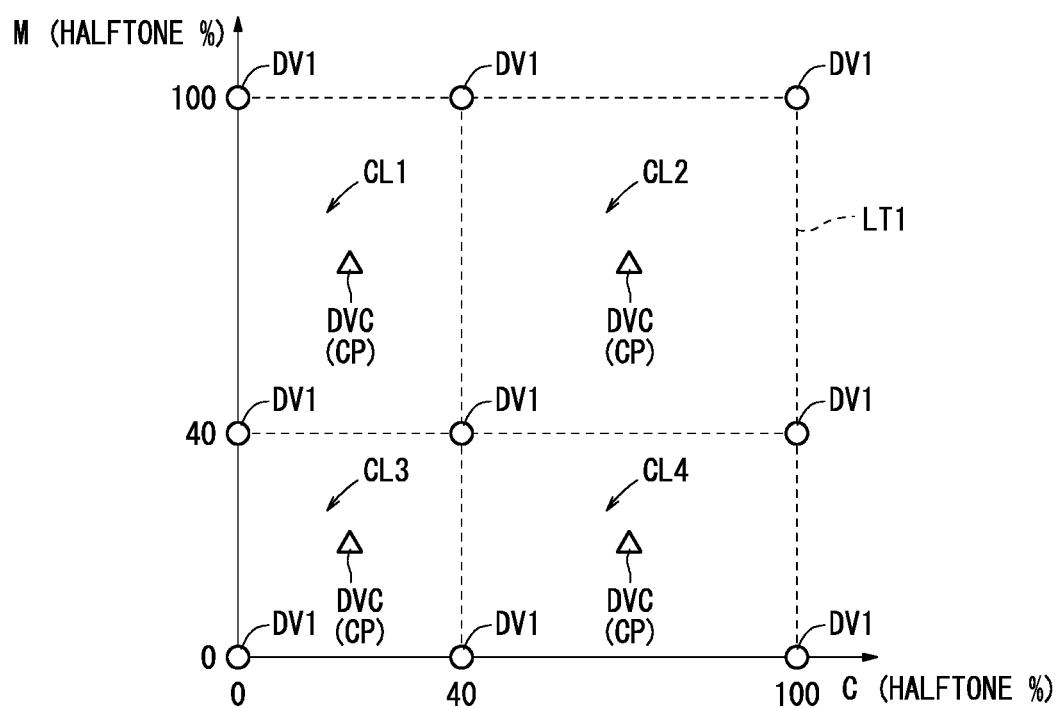
FIG. 8 is a graph showing the positional relationship between a first lattice point, a second lattice point, and a cell interior point group.

As shown in FIG. 8, the CMYK space is divided into four cells, i.e., first through fourth cells CL1 through CL4, by nine first lattice points LP1. The first cell CL1 is a rectangular area surrounded by (C, M)=(0, 40), (0, 100), (40, 40), and (40, 100). The second cell CL2 is a rectangular area surrounded by (C, M)=(40, 40), (40, 100), (100, 40), and (100, 100). The third cell CL3 is a rectangular area surrounded by (C, M)=(0, 0), (0, 40), (40, 0), and (40, 40). The fourth cell CL4 is a rectangular area surrounded by (C, M)=(40, 0), (40, 40), (100, 0), and (100, 40).

The interior point group determiner 82 selects an interior point (20, 70) of the first cell CL1, an interior point (70, 70) of the second cell CL2, an interior point (20, 20) of the third cell CL3, and an interior point (70, 20) of the fourth cell CL4, and the selected interior points are determined as making up a cell interior point group CP. Reference characters DVC denote device values corresponding to the cell interior point group CP.

The interior point group determiner 82 may select a plurality of interior points in each cell, or may select a different number of interior points in each cell. Positions of the interior points of the cell interior point group CP may not necessarily agree with positions of the second lattice points LP2. In particular, positions of centers of gravity of the respective cells, which are determined as interior points, are effective to achieve an entire color reproduction accuracy.

In this manner, the first lattice points LP1, the second lattice points LP2, and the cell interior point group CP are determined (steps S1 through S3). Data representing device values DV1, DV2, DVC thereof are temporarily stored in the storage unit 74.

Then, the operator enters a predetermined instruction in order to control the printing machine 18 to print a color chart 36c (step S4).

The chart print data generator 64 shown in FIG. 3 acquires data of device values corresponding to color patches 38 to be printed from the storage unit 74. Then, the chart print data generator 64 generates print data of C, M, Y, K values for printing the color chart 36c from the acquired device value data, and supplies the generated print data to the printing machine driver 58 (refer to the outlined broken-line arrow in FIG. 3).

The printing machine driver 58 converts the print data acquired from the chart print data generator 64 into ink propulsion control data, and outputs the ink propulsion control data as print control signals via the I/F 60 to the printing machine 18, which prints the color chart 36c.

FIG. 9 is a diagram showing by way of example device values corresponding to the color patches 38 shown in FIG. 2. Patch numbers in the left column shown in FIG. 9 refer to identification numbers, which are assigned respectively to the 202 color patches 38, and may be related as desired to the numbers 40 and the alphabetical letters 42 (see FIG. 2).

The device values shown in FIG. 9 include device values DV1 corresponding to the first lattice points LP1, and device values DVC corresponding to the cell interior point group CP. For example, the first lattice points LP1 correspond to part of the patch numbers 1 through 125 (27), the patch numbers 126 through 152 (27), and the patch numbers 153 through 160 (8). The cell interior point group CP corresponds to the patch numbers 161 through 176 (16).

In FIG. 9, among the first lattice points LP1, device values DV1 (data of 19 colors) where K=100% and at least one of the C values, the M values, and the Y values is 40% have been omitted from illustration. The reason for omission of such device values DV1 will be described below.

Figure 10:
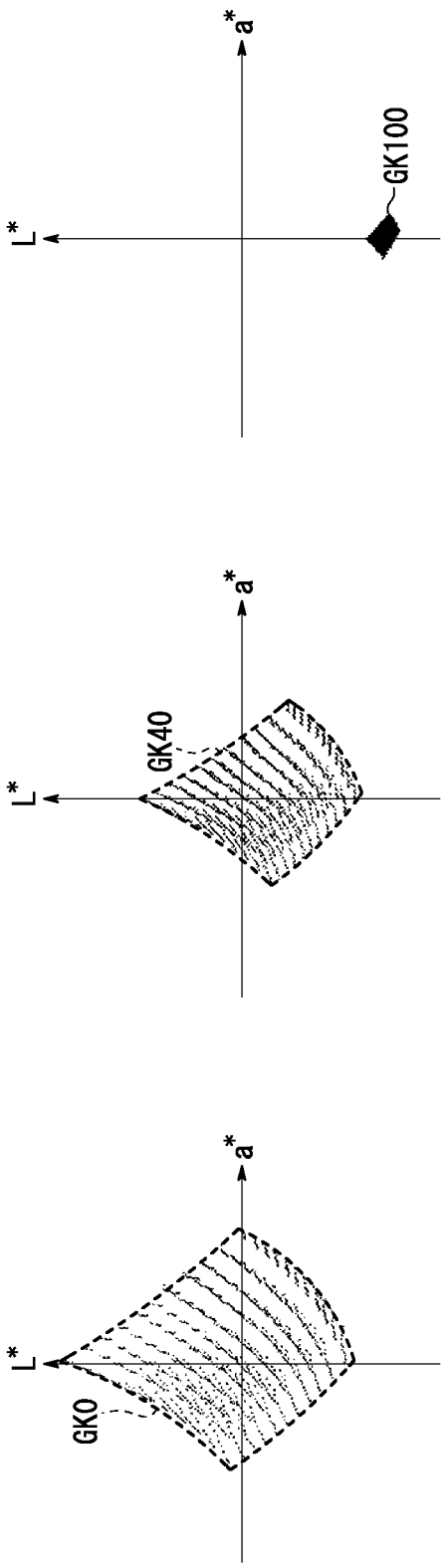
FIGS. 10A through 10C are graphs showing gamuts of a printing machine with a constant K value.

FIGS. 10A through 10C are graphs showing gamuts of the printing machine 18 with a constant K value. Each of the graphs has a horizontal axis representative of L* and a vertical axis representative of a*. Each of the graphs corresponds to a gamut section (b*=0) in a CIELAB coordinate system.

FIG. 10A shows characteristics of a gamut GK0 of the printing machine 18 with K=0%. FIG. 10B shows characteristics of a gamut GK40 of the printing machine 18 with K=40%. FIG. 10C shows characteristics of a gamut GK100 of the printing machine 18 with K=100%. Boundary lines of the gamuts GK0, GK40 are indicated by broken lines.

As shown in FIGS. 10A through 10C, as the value of K increases, the gamut of the printing machine 18 decreases. In a color range with a small gamut (gamut GK100, K=100%), the amount of colorimetric data required for color reproduction prediction is small. Therefore, the man-hours required to print and colorimetrically measure the color patches can be reduced by omitting a portion (i.e., intermediate values) of the first lattice points LP1.

In this manner, the color chart 36c shown in FIG. 2 is obtained (step S4).

In FIG. 5, color patches 38 of the color chart 36c are colorimetrically measured, so that the color reproduction predicting apparatus 16 can acquire colorimetric values depending on the 202 color patches 38 (step S5).

For example, the operator enters a predetermined instruction in order to control the colorimeter 20 to start a process for colorimetrically measuring the color patches 38. The colorimeter 20 repeatedly colorimetrically measures the color patches 38, and continues to acquire colorimetric values until colorimetric values of all of the color patches 38 have been acquired.

At this time, either the color chart 36c to be colorimetrically measured or the colorimeter 20 may be moved relatively in order to automatically measure the color patches 38 colorimetrically. For example, profile data of each of the columns of the color patches 38 may be acquired vertically along the color chart 36c and then analyzed in order to acquire colorimetric values of the color patches 38. In this case, the sequence by which the color patches 38 are measured colorimetrically should preferably be determined in advance.

Alternatively, the color patches 38 may be colorimetrically measured while the color chart 36c is moved manually. In this case, the colorimetric measuring process may be finished depending on the number of times that the color patches 38 have been colorimetrically measured. Further alternatively, a two-dimensional image of the color chart 36c may be captured by a scanner, not shown, and colorimetric values of the color patches 38 may be acquired according to a known image analyzing process, such as an edge detecting process performed on the captured two-dimensional image.

The main unit 22 reads data of the colorimetric values (colorimetric data) of the color patches 38 from the colorimeter 20 via the I/F 70. The storage unit 74 then stores the data of the colorimetric values in association with the device values of the color patches 38. The device values and the data of the colorimetric values may be associated with each other based on a sequence by which the color patches 38 are colorimetrically measured, or based on the layout of the color patches 38. Alternatively, an apparatus, which differs from the color reproduction predicting apparatus 16, may acquire data of the colorimetric values of the color patches 38, and the acquired data may be temporarily stored in the database DB, which can be accessed by the color reproduction predicting apparatus 16.

It is preferable to print the color patches 38 depending on the first lattice points LP1 and the cell interior point group CP on one color chart 36c, for thereby minimizing color reproduction variations caused by the printing machine 18 and the print medium 34, or measurement accuracy variations caused by different types or individual differences of the colorimeter 20.

Figure 11:
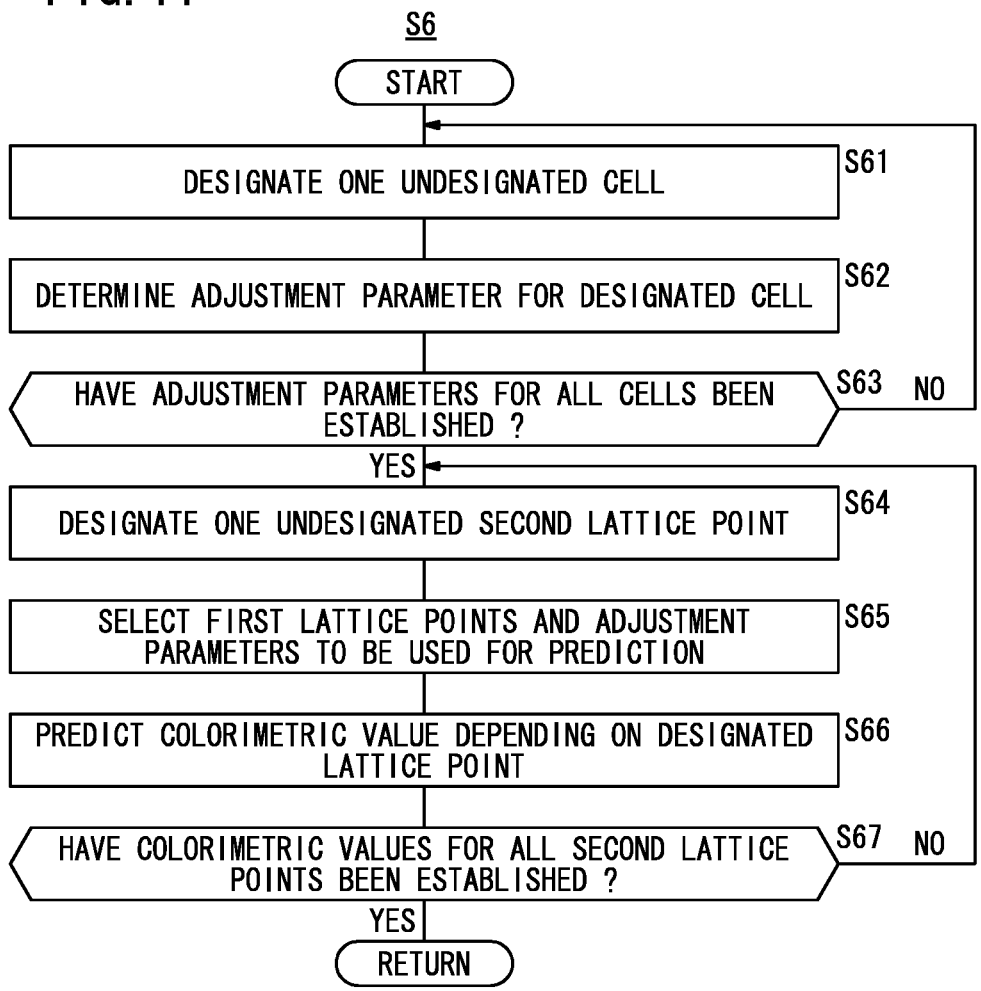
FIG. 11 is a flowchart of a specific process for predicting colorimetric values corresponding to second lattice points.

Then, the colorimetric value predictor 86 predicts colorimetric values depending on the second lattice points LP2 (step S6). A process for predicting colorimetric values in step S6 will be described in detail below with reference to the flowchart shown in FIG. 11 and the functional block diagram shown in FIG. 4.

The adjustment parameter determiner 88 designates one undesignated cell (step S61). Prior to designation of this cell, the data acquirer 84 acquires the data set SV1 of the first lattice points LP1 from the storage unit 74. The data set SV1 of the first lattice points LP1 comprises device values DV1 and colorimetric values CV1 depending on the color patches 38.

The data acquirer 84 also acquires a data set SVC of the cell interior point group CP from the storage unit 74. The data set SVC of the cell interior point group CP comprises device values DVC and colorimetric values CVC depending on the color patches 38.

The adjustment parameter determiner 88 identifies the first through fourth cells CL1 through CL4 (see FIG. 8) by referring to the device values DV1 acquired from the data acquirer 84. It is assumed that the adjustment parameter determiner 88 initially designates the first cell CL1. A cell that is designated by the adjustment parameter determiner 88 will hereinafter be referred to as a "designated cell".

Then, the adjustment parameter determiner 88 determines an adjustment parameter for the designated cell (step S62). For example, according to a cellular Yule-Nielsen spectral Neugebauer model, a colorimetric value $R(\lambda)$ predicted for each light wavelength $\lambda$ is given by the following equation (1):

$$R(\lambda) = \sum_i \{F_i(\lambda) \cdot R_i(\lambda)^{1/n(\lambda)}\}^{n(\lambda)} (i = w, c, m, y, cm, my, yc, cmy) \quad (1)$$

where $F_i(\lambda)$ represents a substantial area ratio of each primary color, $R_i(\lambda)$ represents a colorimetric value of each primary color, and $n(\lambda)$ represents an adjustment parameter for each light wavelength $\lambda$. The light wavelengths comprise 41 data items $\lambda_1$ through $\lambda_{41}$. For example, the light wavelengths may include $\lambda_{1=400}$ nm, . . . , $\lambda_{41=800}$ nm, at intervals of 10 nm.

For example, the colorimetric values $R(\lambda)$, $R_i(\lambda)$ may be represented by spectral reflectances if the print medium 34 is a reflective medium, and by spectral transmittances if the print medium 34 is a transmissive medium.

The color reproduction predicting method according to the present embodiment is characterized by determining an adjustment parameter $n(\lambda)$ for each of the divided cells. Adjustment parameters for the first through fourth cells CL1 through CL4 will hereinafter be denoted by n1 through n4, respectively. For illustrative purposes, an adjustment parameter may simply be denoted by n, with the light wavelength $\lambda$ being omitted.

The adjustment parameter determiner 88 determines an adjustment parameter n1 for the first cell CL1, based on the data set SV1 of the first lattice points LP1 that make up the first cell CL1, the device value DVC {corresponding to (20, 70) in FIG. 8} corresponding to the interior point of the first cell CL1, and the colorimetric value CVC corresponding to the interior point. More specifically, the adjustment parameter determiner 88 determines an adjustment parameter n1 in order to minimize the difference between the colorimetric value CVC acquired by the colorimetric measuring process (hereinafter referred to as a "measured value") and the colorimetric value predicted using the prediction model indicated by equation (1) (hereinafter referred to as a "predicted value").

For example, the adjustment parameter determiner 88 determines an adjustment parameter n1 in order to minimize the SSD (Sum of Square Differences) between the measured value and the predicted value. Instead of SSD, the adjustment parameter determiner 88 may use other known evaluating functions, including NCC (Normalized Cross Correlation) and SAD (Sum of Absolute Differences).

In the above process of determining an adjustment parameter n1, the interior point of the first cell CL1 may not agree with a second lattice point LP2. The first cell CL1 may have a plurality of interior points, and the adjustment parameter determiner 88 may determine an adjustment parameter n1 based on evaluations at such interior points. This also holds true for the other cells, i.e., the second cell CL2, the third cell CL3, and the fourth cell CL4.

Then, the adjustment parameter determiner 88 determines whether the adjustment parameters n1 through n4 have been established for all of the cells or not (step S63). If there is a cell for which an adjustment parameter n1 has not yet been established, then control goes back to step S61, whereupon the adjustment parameter determiner 88 designates the undesignated cell, and determines an adjustment parameter n for the designated cell (steps S61, S62). If adjustment parameters n1 through n4 have been established for all of the cells, then control proceeds to step S64.

The colorimetric value predictor 86 designates an undesignated second lattice point LP2 (step S64). The colorimetric value predictor 86 designates a set of device values DV2 from among the device values DV2 acquired from the lattice point determiner 80.

Figure 12:
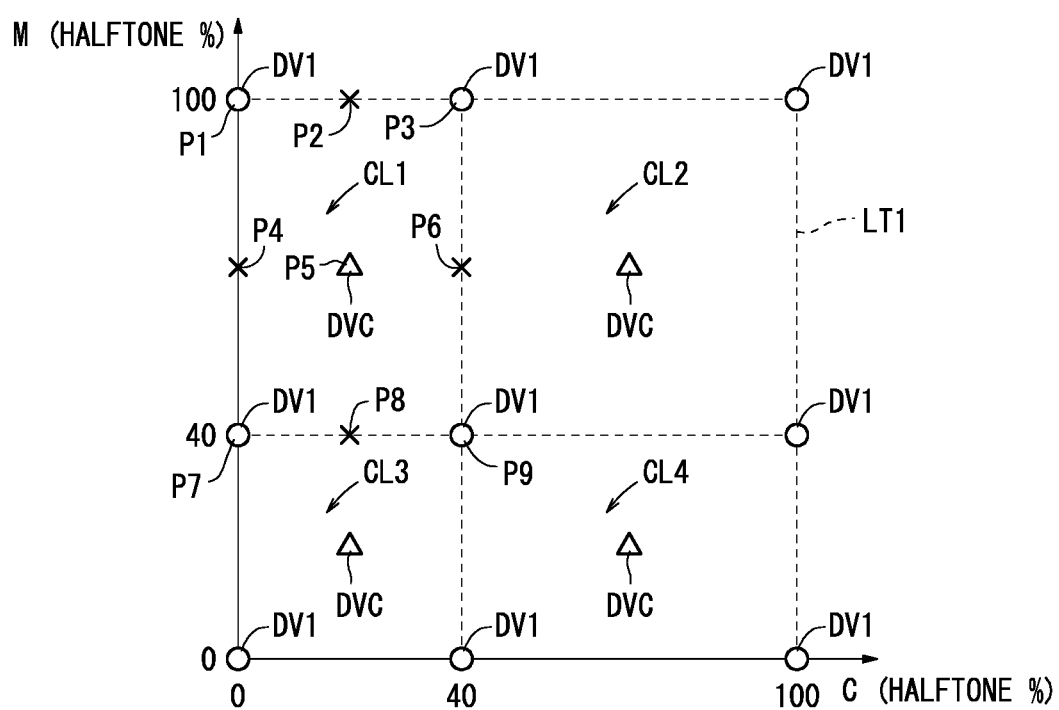
FIG. 12 is a graph showing a predicted example of colorimetric values corresponding to second lattice points.

As shown in FIG. 12, it is assumed that colorimetric values are successively measured with respect to nine points P1 through P9, which belong to the first cell CL1. Since each of the points P1, P3, P7, P9 agrees with either one of the first lattice points LP1, colorimetric values CV1 therefor have already been acquired by the colorimetric measuring process. Since the point P5 agrees with either one of the interior points belonging to the cell interior point group CP, a colorimetric value CVC therefor has already been acquired by the colorimetric measuring process. Accordingly, no prediction is made as to colorimetric values for these points, whereas colorimetric values CV2 for the remaining points P2, P4, P6, P8 are predicted.

It is assumed that the colorimetric value predictor 86 initially designates the point P2 as a second lattice point LP2. The second lattice point LP2 designated by the colorimetric value predictor 86 will hereinafter be referred to simply as a "designated lattice point".

Then, the colorimetric value predictor 86 selects first lattice points LP2 and adjustment parameters n to be used for predicting colorimetric values (step S65). The colorimetric value predictor 86 identifies four cells, i.e., first through fourth cells CL1 through CL4 (see FIG. 8), by referring to the device values DV1 acquired from the data acquirer 84. As a result, the point P2 is judged as belonging to the first cell CL1. The data set SV1 depending on the first cell CL1 and the adjustment parameter n1 depending on the first cell CL1 also are selected.

Then, the colorimetric value predictor 86 predicts a colorimetric value CV2 depending on the designated lattice point (step S66). More specifically, the colorimetric value predictor 86 applies the data set SV1 and the adjustment parameter n1 depending on the first cell CL2 according to the cellular Yule-Nielsen spectral Neugebauer model indicated by the above equation (1), thereby predicting a colorimetric value CV2 for the point P2.

Then, the colorimetric value predictor 86 determines whether the colorimetric values CV2 have been established for all of the second lattice points LP2 or not (step S67). If there is a second lattice point LP2 for which a colorimetric value CV2 has not yet been established, then control goes back to step S64, whereupon the colorimetric value predictor 86 designates the undesignated second lattice point LP2, and predicts a colorimetric value CV2 for the designated second lattice point (steps S64 through S66). For example, the colorimetric value predictor 86 predicts colorimetric values CV2 for points P4, P6, P8, in addition to point P2 in the first cell CL2. Point P6 exists on the boundary between the first cell CL1 and the second cell CL2. The colorimetric value predictor 86 may determine the cell to which point P6 belongs according to a given rule. Alternatively, the colorimetric value predictor 86 may determine a colorimetric value CV2 for point P6 based on predictions made for the first cell CL1 and the second cell CL2.

If colorimetric values CV2 have been established for all of the second lattice points LP2, then the process for predicting colorimetric values CV2 depending on the second lattice points LP2 comes to an end (step S6 in FIG. 5).

Figure 13:
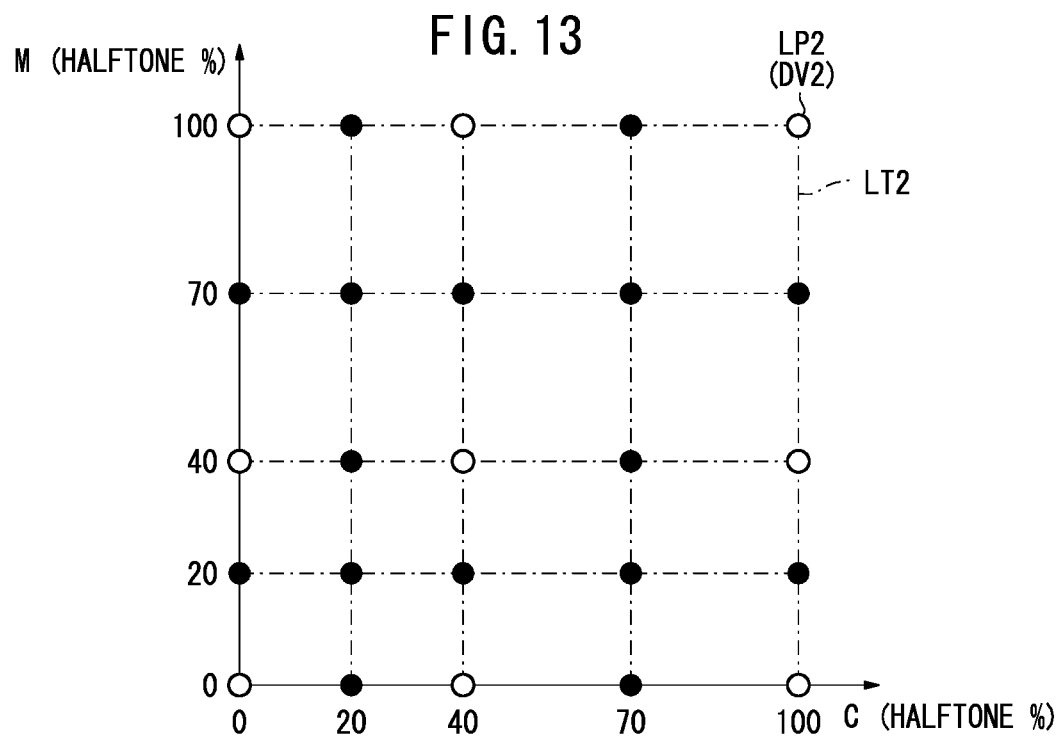
FIG. 13 is a graph showing a determined result of colorimetric values corresponding to second lattice points.

Colorimetric values CV2 depending on the second lattice points LP2 are obtained as shown in FIG. 13. In FIG. 13, the plotted white dots refer to points where colorimetric values are determined by colorimetrically measuring the color patches 38, and the plotted black dots refer to points where calorimetric values are predicted by the colorimetric value predictor 86.

Then, the colorimetric value predictor 86 predicts colorimetric values CV3 depending on the third lattice points LP3 (step S7 in FIG. 5). The colorimetric value predictor 86 may predict colorimetric values CV3 using a known predicting algorithm, including a volumetric transform and a Neugebauer model. In this manner, a data set SV3 required to generate a color conversion table is acquired. For example, third lattice points LP3 are formed by independently varying C, M, Y, K values at intervals of 10%. In this case, 14641 device values DV3 (11×11×11×11=14641) are generated for the third lattice points LP3.

Finally, the colorimetric value predictor 86 generates a profile that matches the printing machine 18 (step S8).

More specifically, the color conversion table generator 90 generates a color conversion table using the data set SV3 of the third lattice points LP3. If the total number of data that makes up the data set SV2 of the second lattice points LP2 is large enough, then the color conversion table generator 90 may generate a color conversion table using the data set SV2 of the second lattice points LP2.

The color conversion table generator 90 generates a profile by incorporating the generated color conversion table into predetermined file data. Thereafter, the color conversion table generator 90 supplies the profile in the form of a file to the storage unit 74.

The storage unit 74 stores the profile in association with the type of printing machine 18 and the type of print medium 34. Alternatively, the storage unit 74 may send the profile via the I/F 52 to the network 12, in order for the database DB (see FIG. 1) to store and manage the profile.

Operation of the color reproduction predicting apparatus 16 for producing a print using a profile will be described below with reference to FIG. 3.

The operator enters a predetermined instruction in order to control the printing machine 18 to print a print 36. The color reproduction predicting apparatus 16 receives an electronic manuscript (PDL format), which is supplied from the editing apparatus 14 via the network 12 and the I/F 52. The electronic manuscript is represented by page description language (PDL) data that are descriptive of the print 36.

The RIP 54 converts the data of the electronic manuscript (PDL format) received from the editing apparatus 14 into device-dependent data in a raster format (e.g., 8-bit C, M, Y, K values).

Prior to the color conversion process, the color converter 56 selectively acquires a profile stored in the storage unit 74 or the database DB. For example, the color converter 56 can select an appropriate profile by referring to the content of a job ticket, and by acquiring the type of printing machine 18 and the type of print medium 34 that is used to produce the print 36.

The input profile processor 76 converts the device-dependent data acquired from the RIP 54 into device-independent data (e.g., L*, a*, b* values). The output profile processor 78 converts the device-independent data acquired from the input profile processor 76 into device-dependent data (e.g., C, M, Y, K values). The printing machine driver 58 converts the device-dependent data acquired from the output profile processor 78 into print control signals (ink propulsion control data). The printing machine driver 58 then outputs the print control signals via the I/F 60 to the printing machine 18, so as to control the printing machine 18 to print the desired print 36.

The inventor of the present invention has experimentally confirmed that colorimetric values predicted (or the profile generated) by the color reproduction predicting apparatus 16 exhibit high color reproduction accuracy. More specifically, the inventor printed color patches 38 in about 7000 colors, using profiles generated in the Inventive Example based on the present embodiment and Comparative Examples 1 through 3, and by statistically analyzing the color differences between measured values and design values (both as L*, a*, b* values) of the color patches 38. An ink jet printer, product name: LuxelJet UV350 GTW (manufactured by FUJIFILM Corporation), was used as the printing machine 18. A white glossy sheet with a base made of vinyl chloride, product name: LAG mount P-280RW (manufactured by Lintec Co., Ltd.), was used as the print medium 34.

Figure 14:
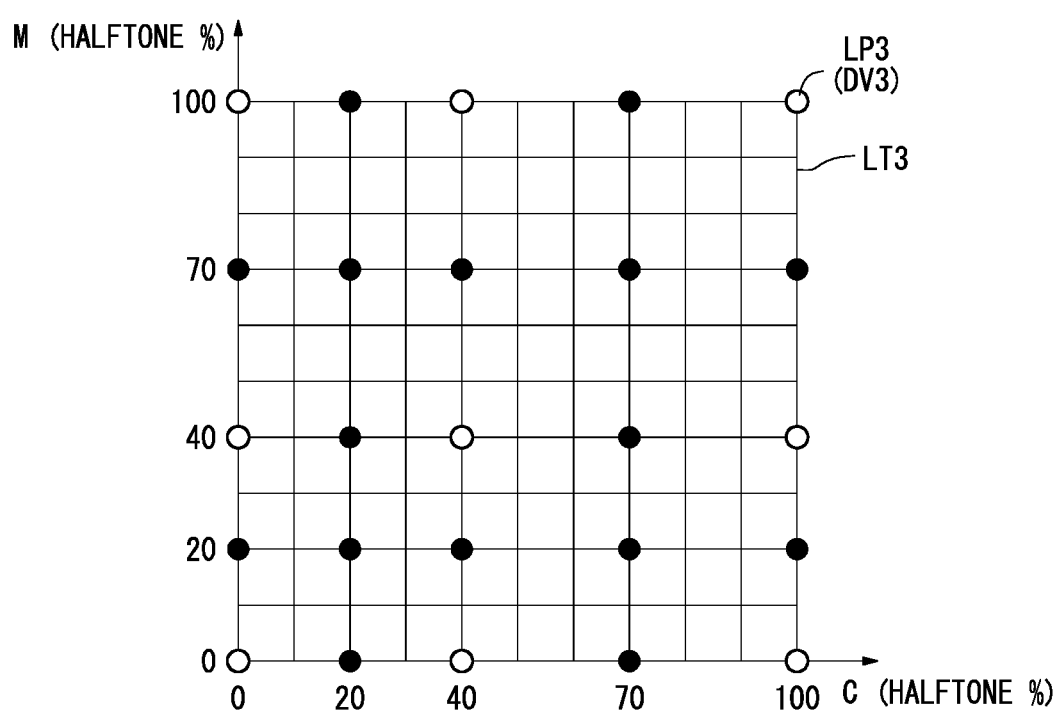
FIG. 14 is a graph showing a determined result of colorimetric values corresponding to third lattice points.

According to Comparative Example 1, after color patches in 928 colors based on International Standards (ISO 12642) were printed and colorimetrically measured, colorimetric values CV3 for third lattice points LP3 (see FIG. 14) were predicted by volumetric interpolation based on a known algorithm, and a profile was generated based on the predicted colorimetric values CV3.

According to Comparative Example 2, after color patches 38 in 186 colors, except for 16 colors (patch numbers 161 through 176 corresponding to the cell interior point group CP), of the 202 colors shown in FIG. 9 were printed and colorimetrically measured, colorimetric values CV3 for third lattice points LP3 were predicted using a cellular spectral Neugebauer model, and a profile was generated based on the predicted colorimetric values CV3.

According to Comparative Example 3, after color patches 38 in 186 colors, which were the same as those according to Comparative Example 2, were printed and colorimetrically measured, colorimetric values CV3 for third lattice points LP3 were predicted using a cellular Yule-Nielsen spectral Neugebauer model, and a profile was generated based on the predicted colorimetric values CV3. Adjustment parameters n for the respective cells were of a constant value (n1=n2=n3=n4=10).

According to the Inventive Example, after color patches 38 in the 202 colors shown in FIG. 9 were printed and colorimetrically measured, colorimetric values CV3 for third lattice points LP3 were predicted using a cellular Yule-Nielsen spectral Neugebauer model, and a profile was generated based on the predicted colorimetric values CV3. For predicting the colorimetric values CV3, adjustment parameters n1 through n4 depending on the cells, i.e., the first through fourth cells CL1 through CL4, were used.

FIG. 15 is a diagram showing results of a comparison between color reproduction accuracies of the Inventive Example and Comparative Examples 1 through 3. In the Inventive Example and in Comparative Examples 1 through 3, after color differences between measured values and designed values (both as L*, a*, b* values) of the color patches 38 were calculated, (1) average values thereof, (2) maximum values thereof, (3) average values for respective colors at K=0%, (4) average values for respective colors at K=20%, (5) average values for respective colors at K=40%, and (6) average values for respective colors at K=70% were calculated.

Compared with Comparative Example 1, the Inventive Example achieved substantially equivalent results for all of the values (1) through (6). In other words, according to the Inventive Example, high color reproduction accuracy was achieved, despite the fact that the number of color patches used to generate a profile was reduced by about one-fourth.

Compared with Comparative Example 2, the Inventive Example achieved substantially equivalent results for values (1) through (3), and achieved good results for the values (4) through (6). In particular, the Inventive Example exhibited an outstanding statistical significance for the K values as such values become greater. According to the Inventive Example, highly increased color reproduction accuracy was achieved in a color range (in particular, in shadows) where the K value is non-zero, due to the fact that the number of color patches used to generate the profile was increased by sixteen.

Compared with Comparative Example 3, the Inventive Example achieved good results for all of the values (1) through (6). The obtained results are presumed to be caused by an impaired color reproduction accuracy, because the values of the adjustment parameters n to which the cellular Yule-Nielsen spectral Neugebauer model was applied were not appropriate.

As described above, first lattice points LP1 for forming a first lattice LT1 in a device value space, and second lattice points LP2 for forming a second lattice LT2 in the device value space, the second lattice LT2 having smaller lattice intervals than the first lattice LT1, are determined. At least one interior point at a time is determined for each of cells, i.e., first through fourth cells CL1 through CL4, defined based on the first lattice points LP1. In this manner, a cell interior point group CP of the first lattice LT1 is determined, and colorimetric values CV2 for device values DV2 of the second lattice points LP2 are predicted based on device values DV1 and colorimetric values CV1 corresponding to the first lattice points LP1, as well as device values DVC and colorimetric values CVC corresponding to the cell interior point group CP. The first lattice points LP1 and the cell interior point group CP are used together to allow colorimetrically measured points (plotted points of measured data) in the device value space to be arranged uniformly and efficiently. Consequently, the minimum distance between any desired point and a colorimetrically measured point is made smaller than if simple lattice points were used. The smaller minimum distance manifests itself in the vicinity of positions of centers of gravity of the cells. As a consequence, high color reproduction accuracy is accomplished without the need for reduced lattice intervals of the first lattice LT1, i.e., even in a case where a small number of color patches 38 are printed and colorimetrically measured.

In the above embodiment, the color chart 36c has 202 color patches 38, 41 spectral data of which are used, and the light wavelengths are spaced at intervals of 10 nm. However, the number of color patches 38, the number of spectral data, and the intervals of the light wavelengths may freely be varied taking into consideration the color reproduction accuracy to be accomplished, the image processing time required, etc.

In the above embodiment, the device-dependent data are in four colors (C, M, Y, K). However, the device-dependent data may be in two or more desired colors.

In the above embodiment, the printing machine 18 comprises an ink jet printer. However, the printing machine 18 may comprise an electrophotographic printer, a thermosensitive printer, or the like.

Although a certain preferred embodiment of the present invention has been shown and described in detail, it should be understood that various changes and modifications may be made to the embodiment without departing from the scope of the invention as set forth in the appended claims.

What is claimed is:

1. A color reproduction predicting apparatus comprising:
a lattice point determiner for determining first lattice points for forming a first lattice in a device value space, and second lattice points for forming a second lattice in the device value space, the first lattice points and the second lattice points covering a common range in the device value space, the second lattice having smaller lattice intervals than the first lattice;
an interior point group determiner for determining a cell interior point group of the first lattice by determining at least one interior point for each of cells defined based on the first lattice points determined by the lattice point determiner;
an adjustment parameter detetminer for determining at least one adjustment parameter for each of the cells, the at least one adjustment parameter identifying a prediction model for colorimetric values on or inside a boundary of each of the cells, using device values of the cell interior point group determined by the interior point group determiner and colorimetric values of the cell interior point group corresponding to the device values of the cell interior point group; and
a colorimetric value predictor for predicting colorimetric values for device values of the second lattice points determined by the lattice point determiner, based on device values and colorimetric values corresponding to the first lattice points determined by the lattice point determiner, by applying the prediction model identified by the at least one adjustment parameter determined by the adjustment parameter determiner to each of the cells.

2. The color reproduction predicting apparatus according to claim 1, wherein the adjustment parameter determiner determines the adjustment parameters in order to minimize differences between colorimetric values acquired by a colorimetric measuring process and colorimetric values predicted using the predetermined prediction model, at interior points of the cells.

3. The color reproduction predicting apparatus according to claim 1, wherein the colorimetric values are represented by spectral reflectances or spectral transmittances, and the adjustment parameters are parameters for each light wavelength.

4. The color reproduction predicting apparatus according to claim 3, wherein the predetermined prediction model comprises a cellular Yule-Nielsen spectral Neugebauer model.

5. The color reproduction predicting apparatus according to claim 1, wherein the lattice point determiner further determines third lattice points for forming a third lattice in the device value space, the third lattice having smaller lattice intervals than the second lattice; and
the colorimetric value predictor further predicts colorimetric values for device values of the third lattice points determined by the lattice point determiner, based on the predicted colorimetric values corresponding to the second lattice points.

6. The color reproduction predicting apparatus according to claim 1, further comprising:
a data acquirer for acquiring colorimetric values of the first lattice points obtained by colorimetrically measuring a plurality of color patches corresponding to the device values of the first lattice points and colorimetric values of the cell interior point group obtained by colorimetrically measuring a plurality of color patches corresponding to the device values of the cell interior point group.

7. The color reproduction predicting apparatus according to claim 6, wherein the data acquirer acquires colorimetric values that become fewer as the range of a gamut is made smaller.

8. The color reproduction predicting apparatus according to claim 5, further comprising:
a profile generator for generating a profile based on the device values and the colorimetric values corresponding to the second lattice points, or the device values and the colorimetric values corresponding to the third lattice points.

9. The color reproduction predicting apparatus according to claim 8, further comprising:
a color converter for converting colors of a print using the profile generated by the profile generator as an output profile.

10. A color reproduction predicting method comprising:
a lattice point determining step of determining first lattice points for forming a first lattice in a device value space, and second lattice points for forming a second lattice in the device value space, the first lattice points and the second lattice points covering a common range in the device value space, the second lattice having smaller lattice intervals than the first lattice;
an interior point group determining step of determining a cell interior point group of the first lattice by determining at least one interior point for each of cells defined based on the determined first lattice points;
an adjustment parameter determining step of determining at least one adjustment parameter for each of the cells, the at least one adjustment parameter identifying a prediction model for colorimetric values on or inside a boundary of each of the cells, using device values of the cell interior point group determined by the interior point group determining step and colorimetric values of the cell interior point group corresponding to the device values of the cell interior point group; and
a colorimetric value predicting step of predicting colorimetric values for device values of the determined second lattice points, based on device values and colorimetric values corresponding to the determined first lattice points, by applying the prediction model identified by the at least one adjustment parameter determined by the adjustment parameter determining step to each of the cells.

11. A non-transitory recording medium for storing a program for predicting a color reproduction, the program enabling a computer to function as:
a lattice point determiner for determining first lattice points for forming a first lattice in a device value space, and second lattice points for forming a second lattice in the device value space, the first lattice points and the second lattice points covering a common range in the device value space, the second lattice having smaller lattice intervals than the first lattice;
an interior point group determiner for determining a cell interior point group of the first lattice by determining at least one interior point for each of cells defined based on the first lattice points determined by the lattice point determiner;
an adjustment parameter determiner for determining at least one adjustment parameter for each of the cells, the at least one adjustment parameter identifying a prediction model for colorimetric values on or inside a boundary of each of the cells, using device values of the cell interior point group determined by the interior point group determiner and colorimetric values of the cell interior point group corresponding to the device values of the cell interior point group; and
a colorimetric value predictor for predicting colorimetric values for device values of the second lattice points determined by the lattice point determiner, based on device values and colorimetric values corresponding to the first lattice points determined by the lattice point determiner, by applying the prediction model identified by the at least one adjustment parameter determined by the adjustment parameter determiner to each of the cells.

12. The color reproduction predicting apparatus according to claim 1, wherein the lattice point determiner determines each of the first lattice points and the second lattice points from a combination including a lowest value and a highest value of each of the device values.

13. The color reproduction predicting apparatus according to claim 12, wherein the lattice point determiner determines the first lattice points from the combination further including an intermediate value between the lowest value and the highest value of each of the device values.

* * * * *